United States Patent [19]
Lee et al.

[11] Patent Number: 5,937,053
[45] Date of Patent: Aug. 10, 1999

[54] SYSTEM AND METHOD FOR PROCESSING INTERNATIONAL TELEPHONE NUMBERS

[75] Inventors: Linda W. Lee, Warren, N.J.; Robert S. Willner, Petach Tikvah, Israel

[73] Assignee: Telcordia Technologies, Inc., Morristown, N.J.

[21] Appl. No.: 08/782,472

[22] Filed: Jan. 10, 1997

Related U.S. Application Data

[60] Provisional application No. 60/009,642, Jan. 11, 1996.

[51] Int. Cl.⁶ .................................................. H04M 3/42
[52] U.S. Cl. .......................................... 379/220; 379/207
[58] Field of Search .................................. 379/201, 207, 379/219, 220, 221, 229, 230; 370/474

[56] References Cited

U.S. PATENT DOCUMENTS

| | | | |
|---|---|---|---|
| 5,367,566 | 11/1994 | Moe et al. | 379/230 |
| 5,768,361 | 6/1998 | Cowgill | 379/229 |
| 5,771,284 | 6/1998 | Sonnenberg | 379/220 |

*Primary Examiner*—Scott Wolinsky
*Attorney, Agent, or Firm*—Joseph Giordano; David A. Hey; Elizabeth A. Mark

[57] ABSTRACT

An apparatus and method for handling international telephone numbers even in the presence of conflicting national numbering plans wherein the telephone numbers are parsed according to the nature of address of the number, such as international, national, or other. Based on this determination the remainder of telephone number is processed, including parsing the telephone number and executing error handling procedures.

10 Claims, 8 Drawing Sheets

SYSTEM AND METHOD FOR PROCESSING INTERNATIONAL TELEPHONE NUMBERS

CROSS-REFERENCES TO RELATED APPLICATIONS

This application is related and claims priority to U.S. Provisional Patent Appliation No. Ser. 60/009,642 filed Jan. 11, 1996 and now abandoned and which is entitled "System and Method for Processing International Telephone Numbers".

FIELD OF THE INVENTION

This invention relates to the field of Advanced Intelligent Network call processing. More specifically, this invention relates to a method and system for processing international telephone numbers.

BACKGROUND OF THE INVENTION

A. ETSI and INAP

The European Telecommunications Standards Institute (ETSI) has developed the Intelligent Network Application Protocol (INAP), now called the ETSI Core INAP. The Core INAP includes the essential capabilities of the INAP specification needed to support Intelligent Network (IN) service deployment.

To implement the Core INAP on conventional telephone routing and control circuits for North American telephone systems requires modification. The standard equipment must be more flexible.

B. Telephone Number Components

For example, in North America, the first three digits of a ten-digit telephone number -normally designate an Area Code (also called NPA) or a Service Code (such as 800); the next three digits represent an Exchange or Central Office Code (also called an NNX or NXX); and the final four digits represent a specific line within the NPA-NXX.

Outside of North America, telephone numbers often have different lengths and formats. Although such telephone numbers may also have leading digits to designate an area, these "Area Codes," or "City Codes" as they are sometimes called, often have different lengths. Also, the format and content of telephone number parameters vary, and have different dialing scenarios, as does the terminology describing the different parameters. To reduce confusion, this description will use the following terms to refer to different telephone number components.

The term "National Significant Number" refers to a fully qualified subscriber number containing a subscriber's Dialing Area Code and Local Subscriber Number. The "Dialing Area Code" identifies different geographical areas in the telephone network, just as the North American NPA does. The "Local Subscriber Number" is the number dialed to access a subscriber in the same dialing area as the caller.

The term "National Dialing Prefix," sometimes called the "Trunk Prefix," is used to dial in-country Iona distance calls. The National Dialing Prefix is present when the Nature of Address (NOA) value is a "Subscriber" value. The term "National Operator Selection Code," sometimes called the "Carrier Selection Code," refers to digits dialed before the National Dialing Prefix and National Significant Number to select a long distance carrier. The term "International Prefix" or "International Operator Selection Code" refers to digits dialed before a Country Code and National Significant Number to select an international carrier. For some Network Operators, the International Operator Selection code also serves as the International Dialing prefix. There are also other special or miscellaneous numbers. One example is a Service Code to provide 800-like services.

In light of the foregoing, there is a need for telephone switching networks to recognize and respond to telephone numbers from several different countries, and to give telephone switching equipment the flexibility to adapt to different telephone number formats.

SUMMARY OF THE INVENTION

Thus, the present invention is directed to an apparatus and method for parsing foreign telephone numbers according to the nature of the address of those numbers. In particular, a method for parsing a telephone number in an intelligent switch of a telephone network comprises the steps of determining the nature of the address of the telephone number as national, international, or other; and extracting the fields of the telephone number according to the nature of the address.

A telephone communications system according to this invention comprises a plurality of switches to route telephone calls; a plurality of databases having data for routing the telephone calls; and a plurality of intelligent service control points, coupled to the plurality of switches and the plurality of databases, to control the switch routing of telephone calls in accordance with the telephone numbers for those calls. Each Service Control Point (SCP) includes means for determining the nature of the address of the telephone numbers as national, international, or other; and means for extracting the fields of the telephone number according to the nature of the address.

Both the foregoing a general description and the following detailed description are exemplary and explanatory. They provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DESCRIPTION OF THE PREFERRED EMBODIMENT

1. Baseline Network Component and Operation Description

Figure 1:
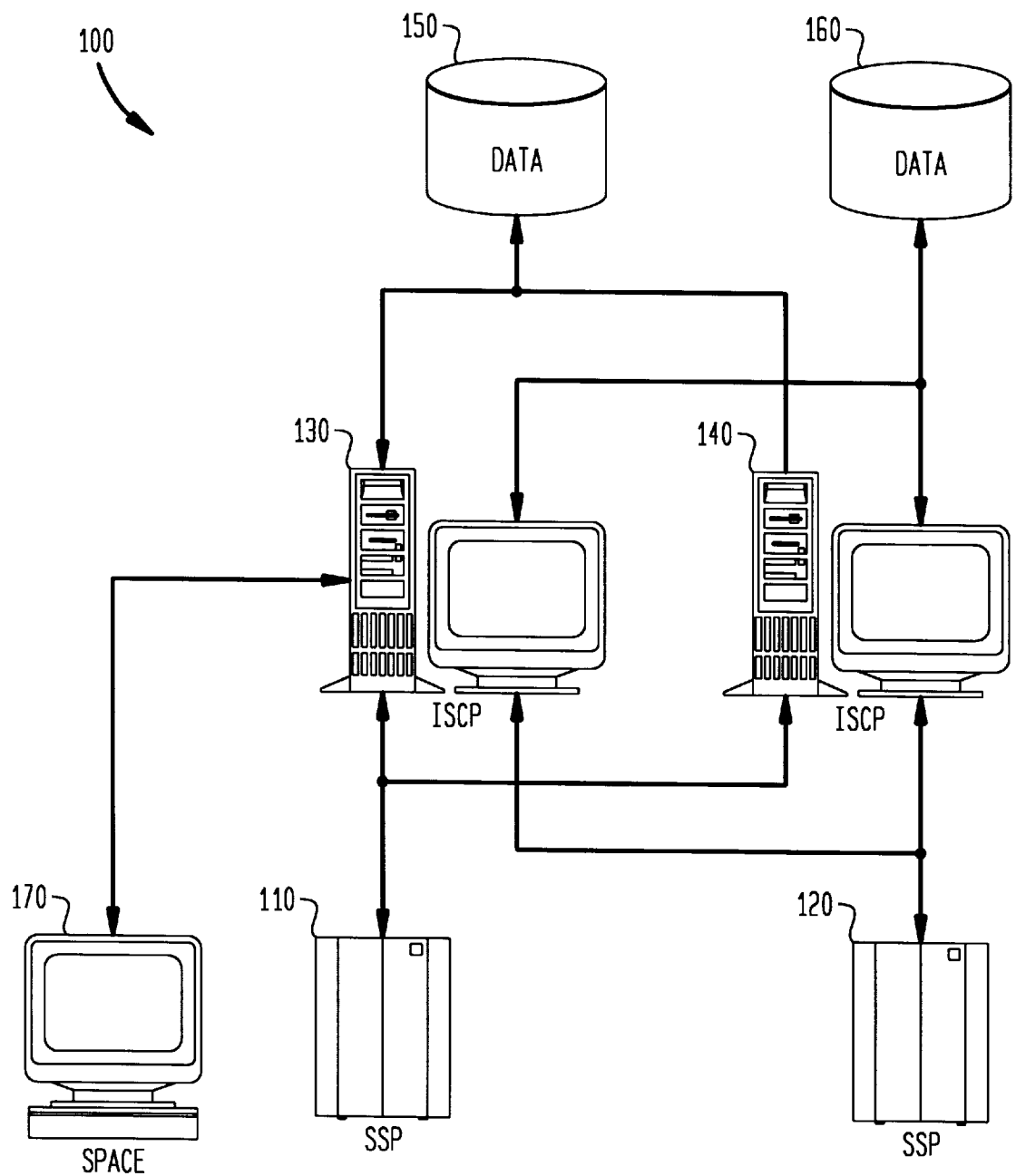
FIG. 1 is a diagram of the principal components of the Advanced Intelligent Network incorporating the present invention.

The preferred embodiment of this invention is a Configurable Numbering Plan feature to provide capabilities that give the ISCP (Intelligent Service Control Point) in the Advanced Intelligent Network (AIN) the ability to handle many different telephone numbering plans for Core INAP Network Operators. FIG. 1 shows a diagram of the principal components of AIN 100.

AIN 100 allows call processing control information to pass between elements in the telephone network through a Common Channel Signaling Network using the Signaling System 7 (SS7) protocol. This arrangement allows SSPs 110, 120 to query ISCPs 130, 140 for information needed to complete or process a call.

Switches equipped to query ISCPs have Service Switching Point (SSP) capability or, equivalently, a Service Switching Function (SSF). SSPs are AIN switching systems that detect triggers for incoming and outgoing calls and generate queries to ISCPs to obtain information to process the calls. ISCPs 130, 140 have Service Control Function (SCF) capability. They support databases 150, 160 that serve as a centralized repository of call processing information and provide external call processing instructions. Signal Transfer Points (STPs) are not shown in FIG. 1, but these are packet switches that route messages between SSPs and ISCPs.

AIN 100 centralizes call processing information in ISCPs 130, 140 for access by multiple SSPs. When SSPs 110, 120 recognize certain calls, such as 800 calls, that require special treatment, the SSPs launch queries to the centralized databases 150, 160 through ISCPs 130, 140. ISCPs 130, 140 in turn derive call processing instructions, such as translating a free phone number (e.g., 800 or 0130), from centralized databases 150, 160 and return the derived information to the SSPs 120, 130 to complete the call or provide other call processing treatment.

By accommodating ETSI CORE INAP standards, the preferred embodiment of this invention extends the capabilities afforded by the standard AIN architecture by allowing SSPs to launch queries in response to a variety of additional conditions. The preferred embodiment also allows a standard set of information to be transmitted between the SSF equipped SSPs and the ISCPs so that the ISCPs can react to a variety of conditions and exercise more control over SSF actions.

ISCPs 130, 140, with a SPACE service creation environment 170 and MSAP (Multi-Service Application Platform) query processing environment, exploit the information content of ETSI Core INAP messages by using a graphical service definition language to make decisions based on incoming parameter values. The same graphical service definition language also fixes the values of parameters passed to outgoing messages that guide call processing at the SSPs.

The preferred embodiment of this invention uses MSAP and SPACE-based CPRs (Call Processing Records). SSPs 110, 120 respond to calls by sending triggers requesting call processing information to ISCPs 130, 140 running MSAP and SPACE-based CPRs. MSAP executes the SPACE-based CPRs corresponding to certain trigger information to provide call processing instructions back to the switch.

ISCP software capabilities allow SPACE service creators to reference telephone number components, and develop service logic tailored to those components. ISCP MSAP capabilities allowed service logic-based telephone number components to be executed in a real-time, call processing environment.

Current ISCP software, however, operates on a ten-digit telephone number with three fixed components: NPA, NXX, and line number. The conventional ISCP capabilities also allow ISCP subsystems, specifically SPACE and the Data and Reports System (DRS), to provide telephone number display.

The SPACE system supports the development of Call Processing Records that represent AIN service logic programs. The SPACE service creation environment specifies service logic via service graphs whose "nodes" represent service processing instructions. The connection of these nodes determines the flow of service processing.

A SPACE CPR combines service graphs that represent different entry points for processing service requests initiated by a SSP query message. The criteria for selection of a particular entry point, i.e., service graph, could be the SSP Trigger Detection Point (TDP) at which the SSP query message was launched.

ETSI Core INAP modifications attach structure to switch-based call processing through a Call Model. The Call Model provides a sequence of call states and flows that describe state transitions based on events. The Call Model is an abstraction of call processing performed in a network switch and divides call processing into a sequence of steps.

TDPs represent the points in call processing at which the SSP can launch a query to an ISCP when necessary criteria have been met. The Call Model defines entities called Points-In-Call (PICs) and Detection Points (DPs). A PIC represents a call state and the call processing step that a call has reached. A DP represents a PIC processing where it is possible and sensible to invoke AIN service logic processing.

The Call Control Function (CCF), implemented on the SSP, controls call processing and provides network connection services. The CCF supports AIN triggering during call processing and access to AIN functionality. The Service Switching Function (SSF), also implemented on the SSP, supports the interaction between the call processing software on the switch and the Service Control Function.

Figure 2:
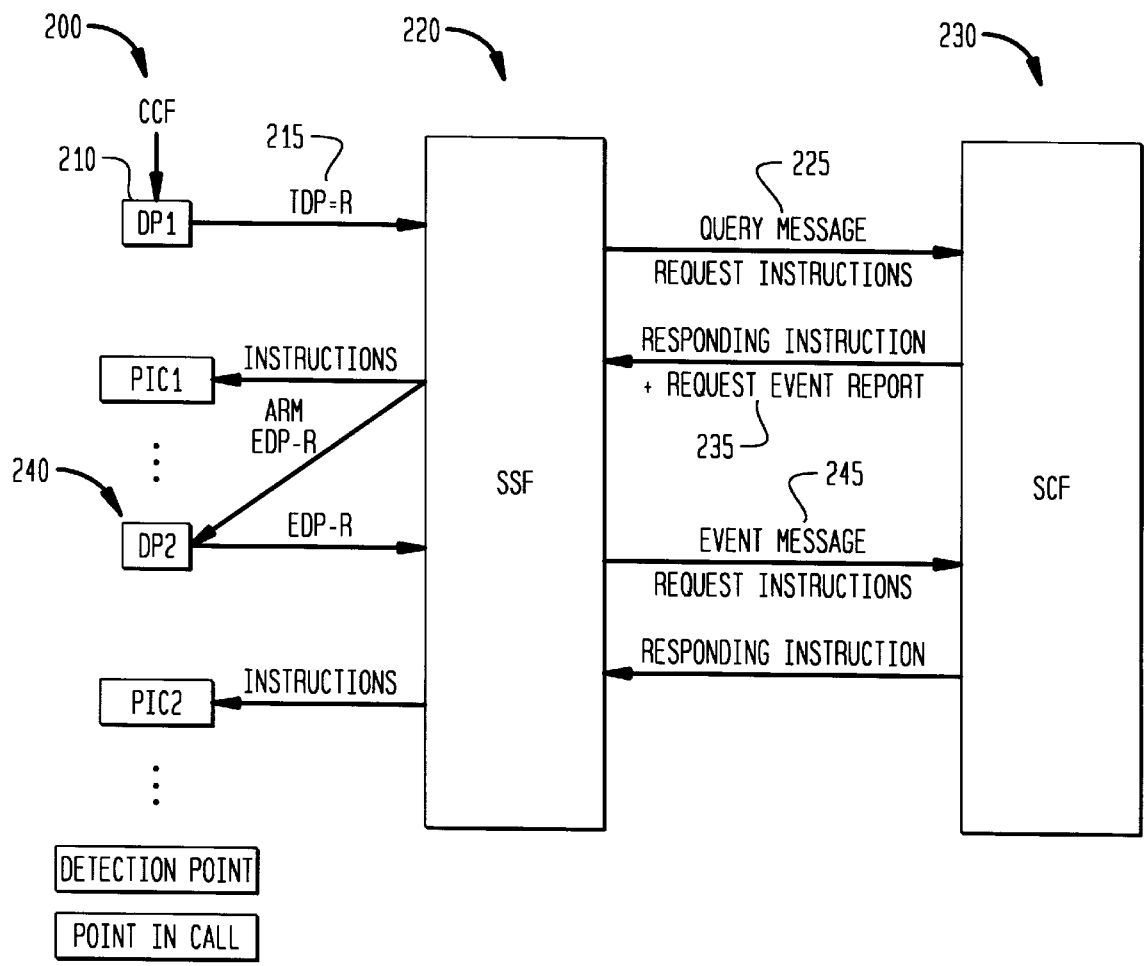
FIG. 2 shows a Call Control Function entity on an element in the AIN of FIG. 1 responsible for call processing.

FIG. 2 shows a CCF entity 200 responsible for call processing. CCF entity 200 includes an implementation of the AIN Call Model. DP 210, one of the detection points defined in the AIN Call Model, has been enabled for one or more AIN customers as a TDP. When call processing reaches DP 210, CCF 200 sends a TDP-Request (TDP-R) 215 to SSF entity 220 in an SSP, and then suspends call processing.

SSF entity 220 checks triggering criteria, resolves service interactions, and handles interface operations with SCF 230 in an ISCP. SCF 230 executes AIN service logic and influences call processing on the switch via its interface to SSF entity 220. This is roughly equivalent to an MSAP within the ISCP.

When SSF entity 220 receives TDP-R 215 from CCF entity 200, SSF entity 220 sends a query message 225 to SCF 230 where service logic processes the message. The SCF 230 response message 235 shown in FIG. 2 includes instructions for call processing and a request to be notified at later call processing events. The event report request arms DP 240 in FIG. 2 as an Event Detection Point (EDP).

The instructions by SCF entity 230 sent in response to the initial query message are executed during call processing. If DP 240 is encountered during later call processing, event report message 245 is sent to SCF entity 230 and invokes service logic on that entity which may return additional instructions for call processing.

The initial message sent by the SSP to open a TCAP transaction is sometimes called the "query message" or the "SSP query message." For example, the Core INAP InitialDP operation sent by SSF entity 220 to initiate SCF entity 230 involvement in an AIN call is sent within a query (TC-Begin) message.

The term "response" refers to any message sent in response to a previously-received message. It could be the final message of a TCAP transaction, a TC-End message, or an intermediate message during a transaction, a TC-Continue message.

The term "message" actually refers to an interface operation that an AIN element such as an SSF or an SCF can invoke on its partner. The term "message" is used interchangeably with the term "operation" because interface operations, such as those defined within Core INAP, are packaged in TCAP messages exchanged between interface partners.

TCAP messages may contain multiple operation invocations. Each operation request in a TCAP message is packaged within a single TCAP component structure. For example, the Furnish Charging Information operation which conveys AIN billing information to the SSP may be packaged in a single TCAP message together with another operation invocation related to call routing.

A SPACE Call Variable (CV) is a service logic program variable defined in the context of a SPACE service graph or CPR. The three categories of SPACE Call Variables are "predefined" Call Variables, "user-defined" call variables, and "environmental" call variables. The set of predefined Call Variables in the SPACE system for the Core INAP feature includes all the Core INAP message parameters listed below in the detailed discussion of messages and parameters. User-defined Call Variables include additional variables defined by the service creator for use within a CPR or service graph. Environmental Call Variables are predefined and contain "state" information such as the time of the day (TOD) and the day of the week (DOW).

The preferred implementation of this invention uses a generic, data-driven approach. The Configurable Numbering Plan feature with the Core INAP Network Operator specific data files provide: (1) screen and Report display of Telephone Numbers (TNs) broken down by components; and (2) the ability to parse telephone numbers into addressable subfields that correspond to TN components. In the preferred implementation, the ISCP software will support numbering plans that conform to ITU (CCITT) standards.

2. System Operation Overview

Figure 3:
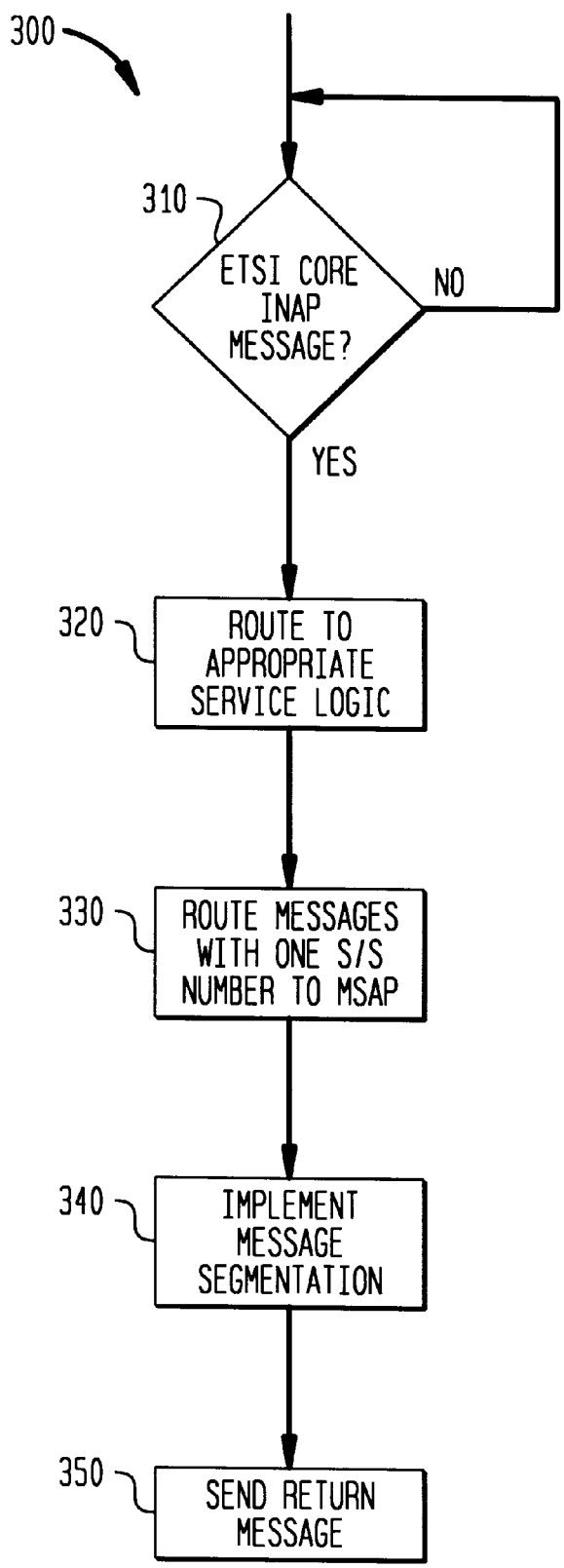
FIG. 3 is a flow diagram showing the principal processing steps in a preferred implementation of this invention.

FIG. 3 shows a flow diagram 300 showing the principal processing for the Core INAP functions. When an ISCP recognizes an incoming message as an ETSI Core INAP message (Step 310), the ISCP routes the message to the appropriate service logic (Step 320).

Next, the ISCP routes the messages with one subsystem number to the ETSI Core INAP message processing capabilities of MSAP (Step 330). Then, the ISCP implements a message segmentation function to support longer messages (Step 340). The message segmentation function reassembles message segments received from the SS7 network into complete application messages.

The ISCP can be addressed by an E.164 number as well as a Signalling Point Code. The ISCP accepts messages routed to it that have the ISCP's E.164 number coded as a global title in the Called Party Address field.

Once the ISCP finishes processing the message, it sends a return message (Step 350). In the return message, the ISCP codes the incoming Calling Party Address as the Called Party Address in the outgoing message, and the incoming Called Party Address as the Calling Party Address of the outgoing message.

The ISCP also provides a global title translation for outbound messages to map global titles to a Signalling Point Code. The Signalling Point Code will be used for outbound message routing.

The MSAP's Service Key Analysis algorithm processes ETSI Core INAP messages based primarily on several parameters in incoming ETSI Core INAP messages. These parameters include Operation Code, Service Key, Calling Party Number, Called Party Number, event Type BCSM. The MSAP can then extract the value of these parameters from an incoming message and map them to decision logic to process the incoming message.

Several ground rules are important to operate the preferred embodiment. First, TN processing functions, such as decomposition of a TN into subfields, only parse the International Operator Selection Codes/Prefixes and International numbers embedded in service logic or present in incoming AIN messages. Second, the SSP population rules of the NOA are the same regardless of the NOA coding rule chosen.

Third, the Operator Selection Code (Carrier Code) cannot be the same value as one of the Core INAP Network Operator Dialing Area Codes. This ensures that the ISCP can determine the presence of the Operator Selection Code. Fourth, the Service Codes are unique and they will not be same as or be part of any other prefix, e.g., Operator Selection code or Area Codes. This is important to determine the presence of the Service Codes.

Fifth, the Service Numbers will be dialed without the Operator Selection codes. Sixth, the data files that drive the Configurable Numbering Plan capabilities will be built by the ISCP project for each network operator and then delivered to the Core INAP Network Operators' sites.

Seventh, the Operator Selection Code or Area Code or Special Prefix may be expanded after the ISCP software installation. The Core INAP Network Operators' must follow the proper procedures for adding new codes or prefixes in the proper table/data file at the Core INAP site.

Eighth, the ISCP can further parse the subscriber subfield of a local telephone number into two additional fields, an exchange code and a line number. Ninth, for Core INAP outbound telephone type parameters, the Service Creator must select the correct NOA Format for each case and populate the correct digits format following the expected coding rules for that NOA.

3. Telephone Number Parsing

The ISCP parses the telephone number to certain core components. Every Telephone Number data type/parameter contains at least three fields: Nature of Address (NOA), Numbering Plan and Address Digits (i.e., actual telephone number). The ISCP parsing rules for the telephone number in the "Address Digits" field into its components depend on the NOA field value.

Figure 4:
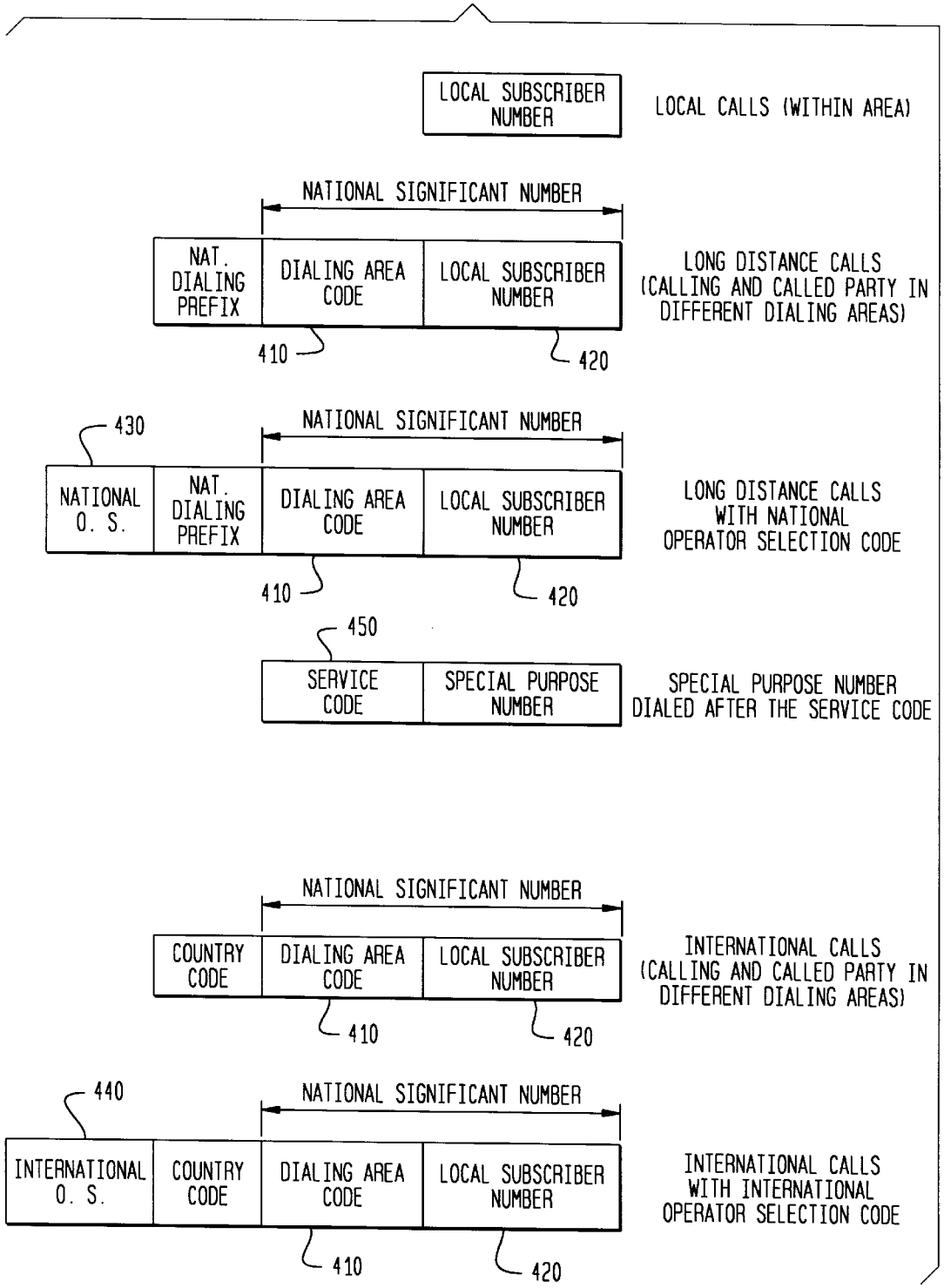
FIG. 4 shows several telephone components parsed in the implementation shown in FIG. 3.

The ISCP parsing rules apply to all Core INAP Telephone address digits. The ISCP recognizes and parses the following telephone components shown in FIG. 4: (1) Dialing Area Code 410; (2) Local Subscriber Number 420; (3) National Operator Selection Code 430; (4) International Prefix or International Operator Selection Code 440; and (5) Special Number/Service Code 450. As FIG. 4 shows, each component may not be present for each telephone number.

Core INAP Network Specific data files support the following components: (1) Dialing Area Code; (2) National Operator Selection Code; (3) International Prefix or International Operator Selection Code; and (4) Special Number—Service Code. The software accesses these data files to find an exact match of these telephone components.

The preferred embodiment of this invention, however, does not parse the International Number after the International Prefix/International Operator Selection Code.

Figure 5:
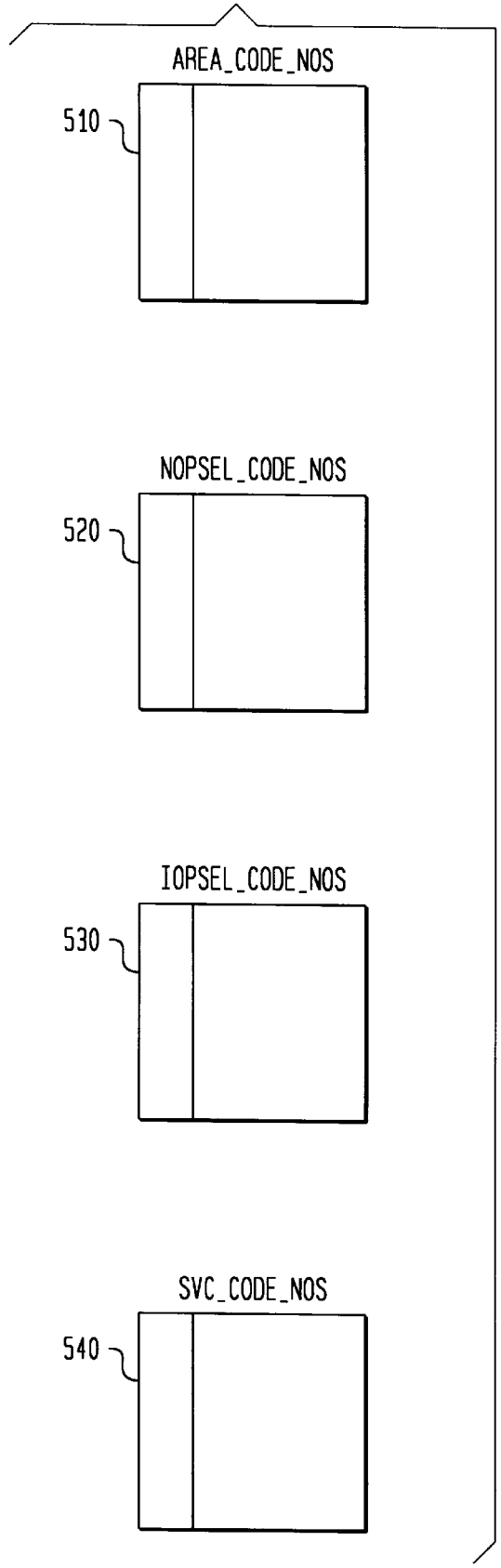
FIG. 5 shows several tables used in the creation of applications for the preferred implementation of the present invention.

Each Core INAP Network Operator, will have four SPACE tables shown in FIG. 5 containing the following TN components: (1) List of area codes 510; (2) List of National Operator Selection Codes 520; (3) List of International Operator Selection Codes and Prefixes 530; and (4) List of Special Number Prefix and Service Codes 540. The MSAP service logic execution and SPACE telephone numbers display share these tables. Core INAP Network Operators that will also use these tables when they invoke generic Core INAP Library Routines during Core INAP Call Execution time or SPACE display of TNs.

The INAP Telephone Parsing routine will take a Core INAP Telephone Number date type structure and return various parsed TN components. This routine will produce one or more of the following TN components as a result of the parsing, although all of them may not be present for a given telephone number:

a) Dialing Area Code (containing the Long Distance Dialing Prefix) or Service Code (assuming the Dialing Area Code and the Service Code are mutually exclusive);

b) Local Subscriber Number;

c) National Operator Selection Code;

d) International Prefix or International Operation Selection Code;

e) Rest of International Number (containing Country Code+Area Code+Subscriber Digits, but without the International Prefix or International Operator Selection Code);

f) National Significant Number (useful when the Area Codes cannot be parsed because no match was found in the table); and g) All Digits Received (containing the whole digits before the Configurable Numbering Plan feature is invoked).

The National Significant Number, described in the Background of the Invention, represents the rest of digits (Area Codes+Subscriber Digits) after the Operator Selection Code. The All Digits Received contains exactly the same digits that were received from the SSP.

Figure 6:
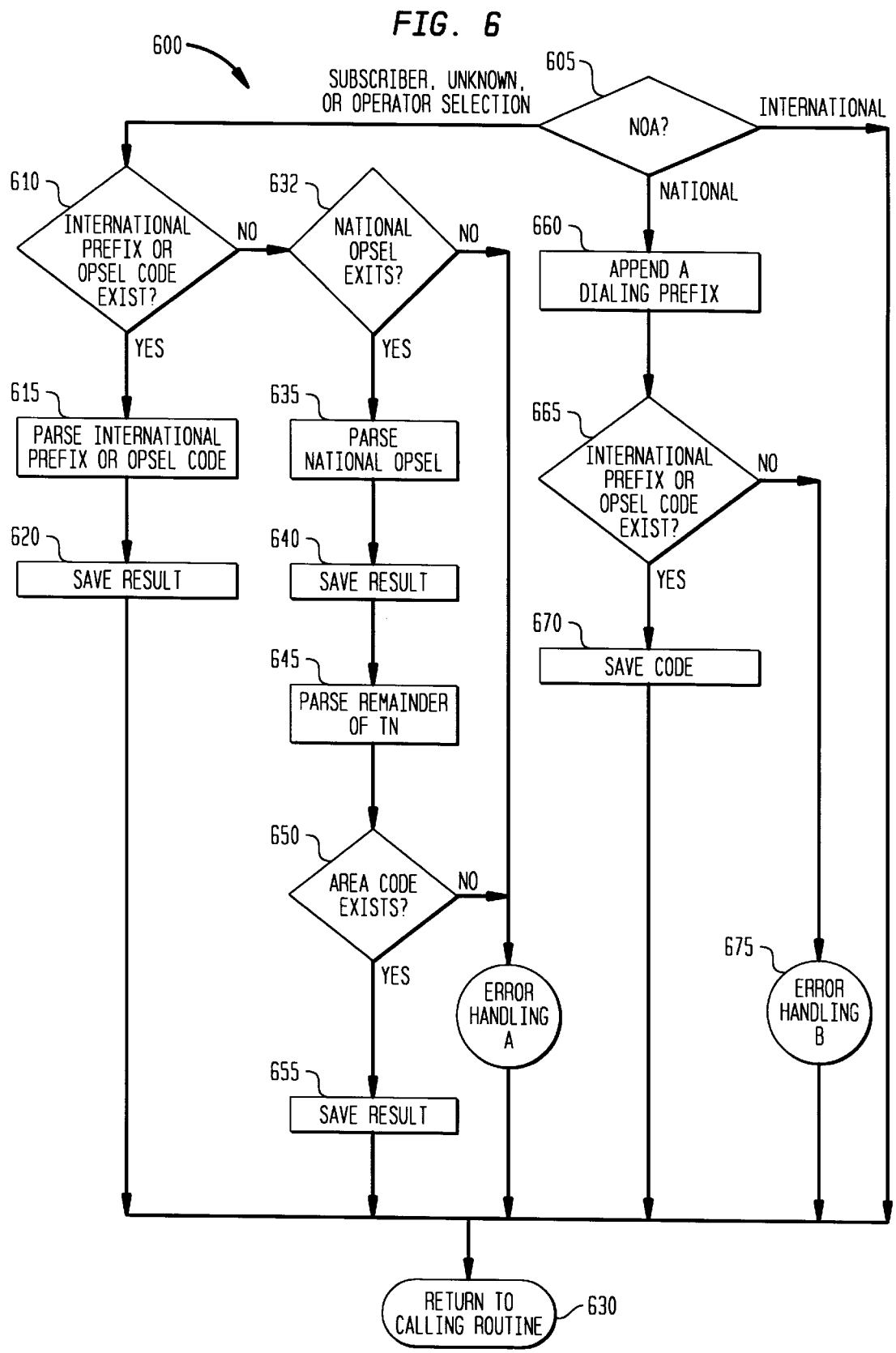
FIG. 6 is a flow diagram of a parsing procedure in accordance with the present invention.

The ISCP parses the TNs in accordance with Parsing Procedure 600 shown in FIG. 6. The different Core INAP Parsing rules depend on NOA values. Before parsing the TN, the ISCP saves all the digits as the "All Digits" component in the "Parsed TN Structure." The ISCP preferably contains a parsed TN Structure with the following fields to store various parsed TN component pieces: area code, svc code, opsel code, sub nbr, all digits, natsig nbr.

In Parsing Procedure 600, the first step is to analyze the NOA (step 605). If NOA=Subscriber or Unknown or Operator Selection, the next step is to examine the International Prefix or International Operator Selection Code (step 610).

If either the International Prefix or International Operator Selection Code exist (i.e., an exact match found in the "IOpSel_Code_NOS" table) (step 610), the ISCP will parse these codes (step 615) and stop further parsing. Once the International Prefix or International Operator Selection Code is parsed, the rest of TN format is expected to be Country Code+Area Code+Subscriber Digits. The ISCP will therefore just save the International Prefix/Operator Selection Code in the "Parsed_TN_Structure" (step 620) and return to the calling routine (step 630).

If the National Operator Selection Code exists (an exact match found in the "NOpSel_Code_NOS" table) (step 632), the ISCP will parse the National Operator Selection code (step 635) and save the "National Operator Selection" code in the "Parsed_TN_Structure" (step 640). The ISCP will also continuing parsing the rest of TN digits into the (Long Distance Prefix+Area Codes)+(Subscriber Digits) (step 645).

If the Area Code exists (i.e., a "Dialing Prefix+Area Code" match appears in the "Area_Code_NOS" table) (step 650), the ISCP will stop parsing. In this case, the "Dialing Prefix+Area Code" component value will be available within the service logic as the "Area Code" TN component selection (i.e., without removing the Dialing Prefix); the remaining digits become the Subscriber Number digits. The ISCP will then save the "Area Code" and Subscriber Digits in the "Parsed_TN_Structure" (step 655) and return to the calling routine (step 630). The Long Distance Prefix is a fixed value for each Core INAP Network Operator and is appended in front of the Area Code for the long distance calls. Also, the Area_Code_NOS table contains the area codes appended with proper Dialing Prefixes.

Figure 7:
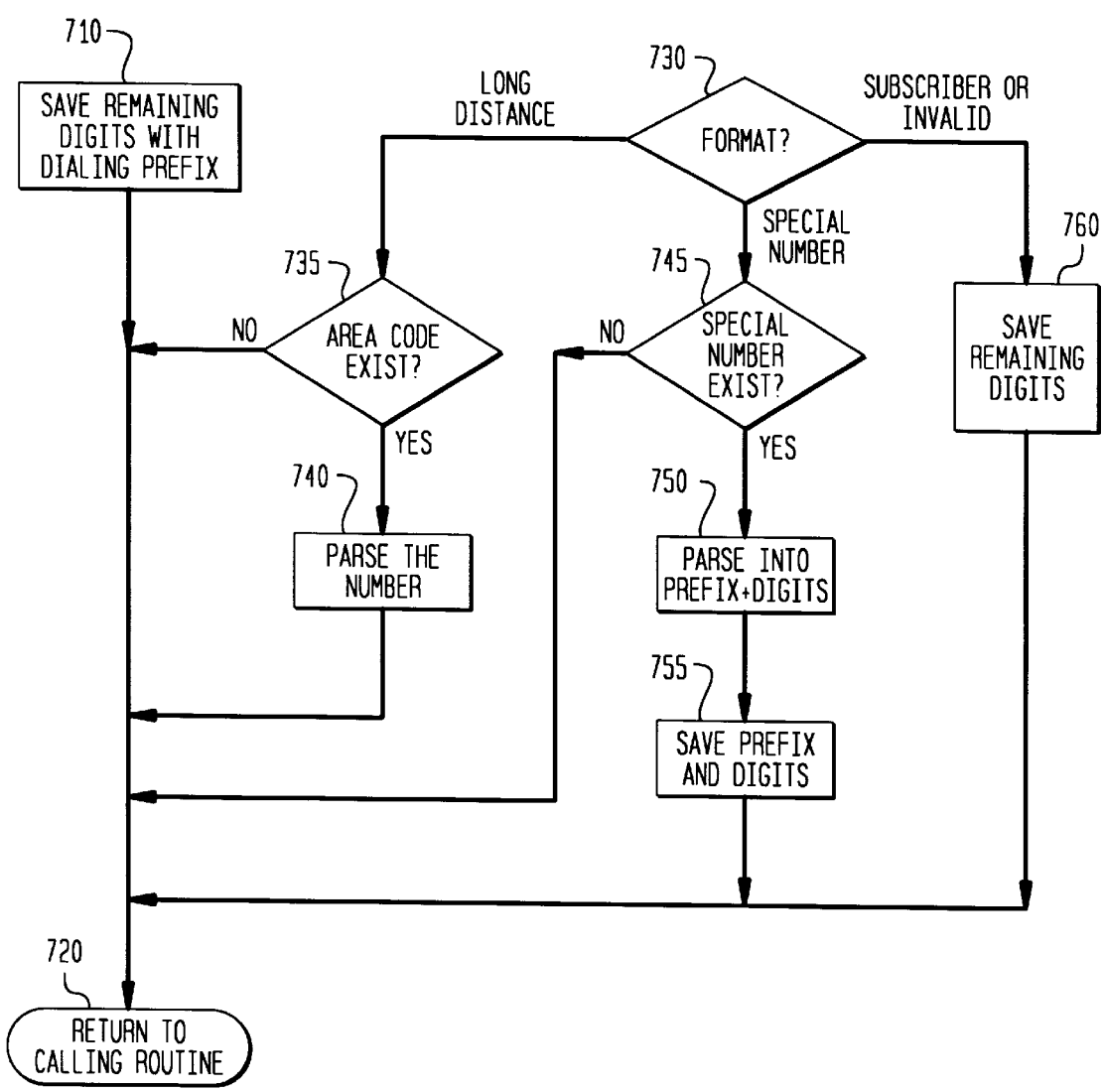
FIG. 7 is a flow diagram showing several steps of a first error handling procedure of the present invention.

Error Handling procedures A are needed for certain conditions. FIG. 7 shows these procedures 700. When the Dialing Prefix+Area Code cannot be parsed, for example because the ISCP found no match in the table, the rest of the digits (Area Codes+Subscriber Digits) will be saved with the "Dialing Prefix" as the "National Significant" TN component in the "Parsed_TN_Structure" (step 710). The ISCP software will then return to the calling routine (step 720).

If no Operator Selection codes are present, the Telephone number format will be one of the following: (1) Long Distance Call TN Format; (2) Special Number/SVC Code Number; (3) Subscriber Number; or (4) Invalid Number (error). The error handling routines differ for each format.

If the format is Long Distance Call TN (step 730), then the ISCP software determines whether the Area Code exists (step 735). This is preferably done by checking whether the "Dialing Prefix+Area Code" matches an entry in the "Area_Code_NOS" table. If so, the ISCP parses the number (step 740) and returns to the calling routine (step 720). On the other hand, if the Area Code does not exist (step 735), the ISCP simply returns to the calling routine (step 720).

If the format is a Special Number (step 730), the ISCP software determines whether the Special Number exists (step 745). This is preferably done by checking for an exact match in the "SVC_Code_NOS" table. If not, the ISCP also returns to the calling routine (step 720).

If the ISCP finds a match, the ISCP software parses the TN into two components: "Service Code/Special Number Prefix" and "Subscriber Digits" (step 750) The ISCP will also save the "Service Code/Special Number prefix" and "Subscriber Digits/Special Number" in the "Parsed_TN_Structure" (step 755) and then return to the calling routine (step 720).

If the format is a Subscriber Number or Invalid Number (step 730), the ISCP software saves the remaining digits as the "Subscriber Digits" TN components in the "Parsed_TN_Structure" (step 760) and then stops parsing and returns to the calling routine (step 720). There are two cases that may give rise to this situation. In the first case, the format may contain the true subscriber digits. In the second case, the number was meant to be either Long Distance Number or Service Number, but the "Area_Code_NOS" or "SVC_Code_NOS" tables did not contain the proper table entries.

In the second case, users can still access the digits that could not be successfully parsed within the service logic as the "Subscriber Number." Users can also access the original digits received from the SSP as the "All Digits Received" TN component.

Returning to FIG. 6, if NOA=National (step 605), the ISCP appends a Dialing Prefix in front of the received digits (step 660). Appending a prefix assists internal parsing because it helps find matching entries in the tables.

If the International Prefix or International Operator Selection Code exists (step 665), which is preferably determined by searching for a match in the "IOpSel_Code_NOS" table 530 in FIG. 5, the ISCP software will stop parsing and save the International Prefix/Operator Selection Code in the "Parsed_TN_Structure" (step 670), and then return to the calling routine (step 630).

Figure 8:
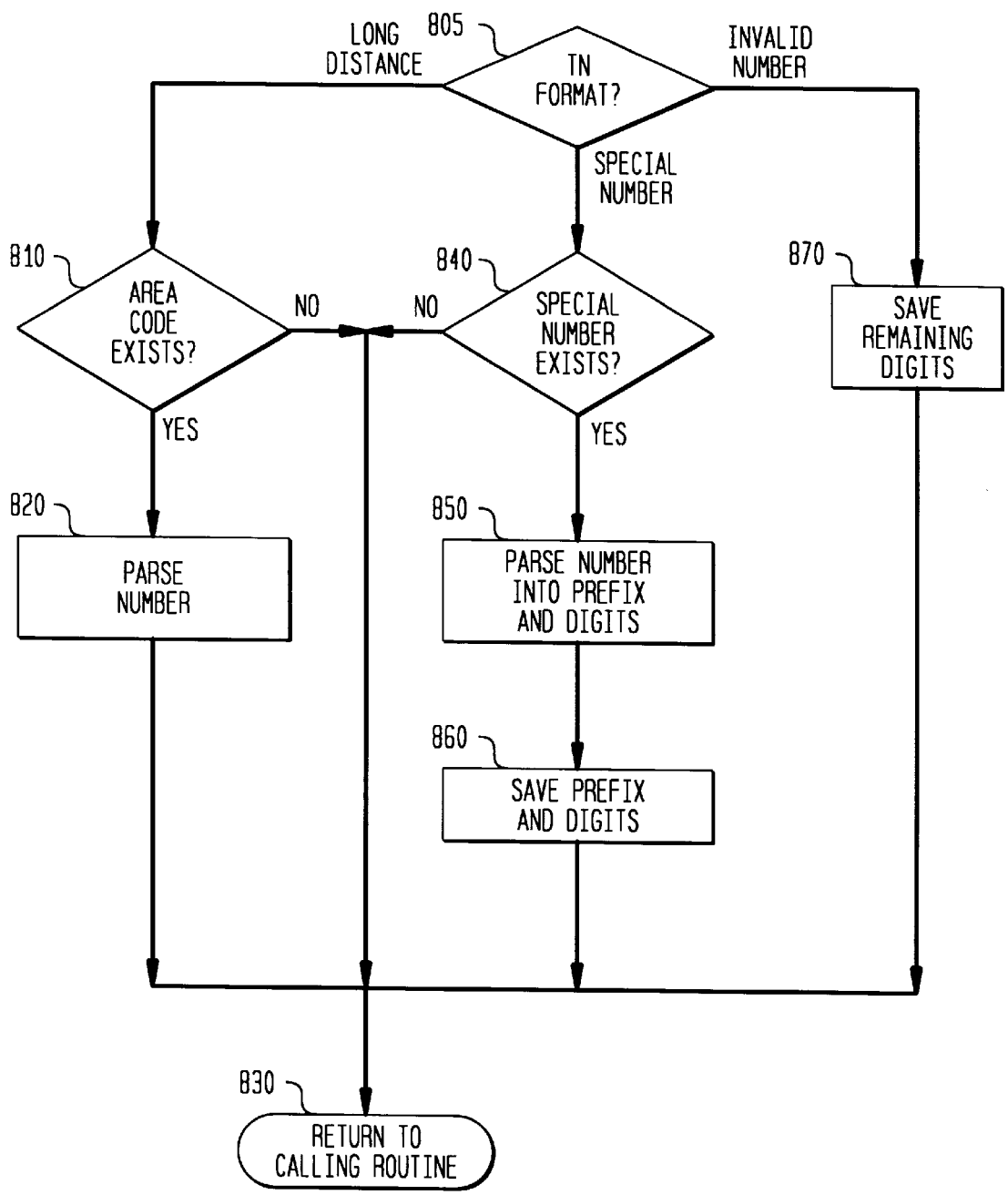
FIG. 8 is a flow diagram showing several steps of a second error handling procedure of the present invention.

If no International Prefix or International Operator Selection Codes are present, the ISCP proceeds to error handling procedure B (step 675) shown as procedure 800 in FIG. 8. That procedure begins by identifying the TN format as one of the following: (1) Long Distance Call TN Format; (2) Special Number/SVC Code Number; or (3) Invalid Number (step 805). Error processing proceeds according to the TN format.

For a Long Distance Call TN format, the first inquiry is whether the Area Code exists (step 810). The preferred technique for this determination inquires whether the "Dialing Prefix+Area Code" matches an entry in the "Area_Code_NOS" table 510 shown in FIG. 5. If so, the ISCP parses the number (step 820) and returns to the calling routine (step 830). At this point, the telephone number still has the "Dialing Prefix," which is country-specific. If the Area Code does not exist (step 810), the ISCP returns to the calling routine (step 830).

For a Special Number format, the first inquiry is whether the Special Number exists (step 840). Preferably, the ISCP searches for an exact match in "SVC_Code_NOS" table 540 in FIG. 5. If not, the ISCP returns to the calling routine (step 830).

If the ISCP finds an exact Special Number match, it parses the Special Number into two components: "Service Code Special Number Prefix" and "Subscriber Digits" (step 850) The ISCP software will then save the "Service Code/Special Number prefix" and "Subscriber Digits/Special Number" in the "Parsed_TN_Structure" (step 860) and return to the calling routine (step 830).

For an Invalid Number, the ISCP software will save the remaining digits as the "Subscriber Digits" TN components in the "Parsed_TN_Structure" (step 870) and simply return to the calling routine (step 830). Usually the number is invalid because it was meant to be either Long Distance Number or Service Number, but the "Area_Code_NOS" or "SVC_Code_NOS" tables did not contain the proper table entries.

Returning to FIG. 6, if NOA=International (step 605), the ISCP will not parse the digits. The expected Telephone number format is: Country Code+Area Code+Subscriber Digits.

Preferably, the ISCP will not parse the TN components during the TCAP parsing time. Instead, it will parse the various telephone components during the execution of the service logic since the service logic may not require access to the telephone components.

As a result of this processing, the following digit coding rules apply for various NOA values:

1. If NOA=Subscriber/Unknown/Operator Selection, the expected format will be one of the following:
   a) International Prefix/International Operator Selection Code (Optional)+Country Code+Area Code+Subscriber Digits;
   b) National Operator Selection Code (Optional)+Long Distance Prefix+Area Code+Subscriber Digits;
   c) Special Number/Service Code+Subscriber Digits; or
   d) Subscriber Digits.
2. If NOA=National, the expected format will be one of the following:
   a) International Prefix/International Operator Selection Code (Optional)+Country Code+Area Code+Subscriber Digits;
   b) National Operator Selection Code (Optional)+Area Code+Subscriber Digits; or
   c) Special Number/Service Code+Subscriber Digits.
3. If NOA=International, the expected format will be:
   a) Country Code+Area Code+Subscriber Digits
4. Library Routines To perform the parsing described about in association with FIGS. 6–8, the ISCP and SPACE use several library routines. The Find_Prefix routine takes a telephone number and the expected TN component ID and returns the matching entry of the proper telephone component specified in the "TN_Compnt_ID" and other parsed TN components, such as the Parsed_TN_Structure. The ISCP or SPACE searches one of the following tables shown in FIG. 5 to find a matching prefix:
   (1) AREA_CODE_NOS 510 when the TN_Compnt_ID=Area_Code_Compnt_ID;
   (2) NOPSEL_CODE_NOS 520 when the TN_compnt_ID=NOp_Sel_Code_Compnt_ID;
   (3) IOPSEL_CODE_NOS 530 when the TN_compnt_ID=IOp_Sel_Code_Compnt_ID; or
   (4) SVC_CODE_NOS 540 when the TN_Compnt_ID=SVC_Code_Compnt_ID.

An MSAP INTERPRETER calls this routine to execute the service logic containing the SPACE Core INAP Node. This routine may also call the Parsing Routine described above with regard to FIGS. 6–8.

The Disp_INAP_TN routine called by the SPACE software takes a telephone number string and returns the format SPACE needs for display. The parsing rules for the display of the TNs into various components are the same as the TN parsing rules explained above regarding FIGS. 6–8. This routine may also call the "Disp_Subs_Nbr" routine after parsing the Subscriber Number component for the subscriber number display.

The Disp_Subs_Nbr routine takes a subscriber number component and returns the format SPACE or DRS software uses for displaying the subscriber number. If the subscriber number has an even number of digits, the software displays the telephone number in two-digits groups. If the subscriber number has an odd number of digits, the software displays the telephone number with the three left-most digits grouped together and the remaining digits in groups of two. For example, for five digit numbers, the display might be "348-32"; for six digit numbers, the display might be "93-68-29"; for seven digit numbers, the display might be "337-45-05"; and for eight digit numbers, the display might be "30-67-86-23."

The ServiceKey Analysis routine may determine "CallingPartyNumber" or "CalledPartyNumber" as the ServiceKey to locate the needed record depending on the user-specified ServiceKey criteria. When the "CallingPartyNumber" or "CalledPartyNumber" becomes the ServiceKey, the value of the ServiceKey is the value of the "address digits" field within the Core INAP. For telephone parameters without the leading prefix, such as National International Operation Selection codes, the Call Variable containing the ServiceKey value is populated after removing the prefix of the "address digits" field within the "CallingPartyNumber" or "CalledPartyNumber."

5. Manipulator

SPACE provides the capability to access and reference the telephone components within any TCAP INAP input or decision node involving a TN through the Telephone Manipulator that supports the Core INAP Telephone Numbers. This support also allows the users to extract the Telephone Component from a Telephone call variable or constant.

The current Manipulator function for North American TNs uses the following syntax: telcomp (<tel>, <component>), where <tel> is replaced by a Telephone call variable or constant, and <component> is an integer value representing telephone component values such as "Plan D," "Nature of Number," "Area Code Value," etc. For Core INAP application, the Manipulator provides the telephone functions associated with "European Numbering Plan," so it allows access to the telephone component values described above.

When this Manipulator cannot find the expected components, it returns the "NULL" numstring value. This may occur when (1) the Manipulator is invoked but the tables are not found; (2) the matching component value is not found in the table; or (3) the Manipulator cannot be invoked on this particular TN component since the "CFN_EQUIPPED" flag is turned off. This latter condition can occur when the "CFN_EQUIPPED" flag was changed to "OFF" after activating the SPACE CPR containing the Core INAP telcomponent manipulator function.

6. MSAP and SPACE Operations

MSAP can parse a telephone number into various components, such as an operator selection code, dialing area code, and subscriber number. The MSAP interpreter will invoke the Manipulator function during the CPR execution as needed.

SPACE permits access and reference to the following telephone components within any TCAP INAP Input Nodes/Decision Nodes involving a telephone number: (1) Dialing Area Code or Service Code (assuming the Dialing Area Code and the Service Code are mutual exclusive); (2) Local Subscriber Number, including (a) National Operator Selection Code, (b) International Prefix or International Operator Selection Code, and (c) Remainder of International Number (with three components (Country Code+Area Code+Subscriber Digits) without the International Prefix or International Operator Selection Code); (4) National Significant Number (useful when the Area Codes cannot be parsed (i.e., no match found in the table) because it represents the rest of digits (Area Codes+Subscriber Digits) after the Operator Selection Code); (5) All Digits Received (contains the whole digits before the Configurable Numbering Plan feature is invoked—this component will contain exactly the same digits as received from the SSP). The National Dialing Prefix is not available to the service creators.

SPACE enters the entire telephone number in one block. Each telephone component need not be entered separately within the SPACE Node editors for the Core INAP Telephone Type parameters. For example, the dialing area code need not be entered separately from the subscriber number.

The ISCP sends the telephone number type parameters in any NOA format and with any digit that service logic populates. The Service Creators select the correct NOA Format for each case and populate the correct digits format following the expected coding rules for that NOA.

Five principal modifications to SPACE support the ETSI Core INAP. First, SPACE includes three new predefined stand-alone tables: AREA_CODE_NOS, NOPSEL_CODE_NOS, IOPSEL_CODE_NOS and SVC_CODE_NOS. Second, SPACE supports display of Area Codes, Operator Selection Codes, and Service Codes in CalledPartyNumbers, CallingPartyNumbers, GenericNumbers, LocationNumbers, and OriginalCalledPartyNumbers. Third, SPACE replaces the North American Numbering Plan Support to support the ETSI Core INAP. Fourth, SPACE has a new Manipulator to support parsing of telephones by the necessary components. Fifth, SPACE supports a new datatype, SubscriberNumber, to support display of subscriber number format.

The stand-alone tables used by the configurable numbering plan has fields for DIGITS (NumString) and DESCRIPTION (String). The DIGITS field is a key field and the description field a non-key field.

The CalledPartyNumber, CallingPartyNumber, GenericNumber, LocationNumber, and OriginalCalledPartyNumber support the display of area codes, operator selection codes, and service codes. These structures will call the Core INAP routine "Disp_INAP_TN( )" to set the display value for the DIGITS field.

SPACE supports the display of local subscriber numbers using a new datatype. The subscriber numbers' format groups of subscriber digits in pairs separated by dashes, as in 25-24-84-37-80. SPACE ignores the dashes in any SubscriberNumber entered by an operator and redisplays the number with dashes in the appropriate places.

The telcomp( ) manipulator accepts Core INAP telephone complex types (CalledPartyNumber, CallingPartyNumber, GenericNumber, LocationNumber, and OriginalCalledPartyNumber). MSAP uses a new manipulator ID so the Find_Prefix routine will identify the Configurable Numbering Plan components rather than those from the North American numbering plan (NPA-NXX-XXXX). The second argument of the telcomp( ) manipulator is preferably the component name.

If SPACE is started and an inconsistency is discovered in any of the configurable numbering plan tables, SPACE issues a strong error for each inconsistency by producing a dialog box with the error text. SPACE, however, continues to run to allow the user the opportunity to load SPACE and modify the configurable numbering plan tables to remove any inconsistencies.

For each inconsistency discovered in the tables, SPACE retains the original definition and, after displaying the error message, ignores the current clashing entry being processed. Thus, the configurable numbering plan continues to display telephone numbers when advising users of clashes in the predefined tables. However, before any of the configurable numbering plan tables can be activated, the user must resolve all inconsistencies.

SPACE's new data-type, "SubscriberNumber," supports the Configurable Numbering Plan. SubscriberNumber is simply a NumString containing the subscriber number TN component.

The TelComponentAsn node assigns digit components of a telephone call variable (e.g. CalledPartyNumber) to a call variable specified by the use. The call variable specified by the user must be a NumString. Unlike IN's TelComponent node, Core INAP's TelComponentAsn node only allows the user to select a single component and not multiple combinations (e.g., NPA+NXX).

The telephone INAP Input nodes allow the user to make a decision on one of the following components: (1) International Operator Selection Code; (2) Remainder of International Number; (3) National Operator Selection Code; (4) Dialing Area Code; (5) Subscriber Number; and (6) All Components.

The five telephone Decide nodes that support the Configurable-Numbering Plan are: (1) CalledPartyNumberDcd; (2) CallingPartyNumberDcd; (3) GenericNumberDcd; (4) LocationNumberDcd; and (5) OrigCalledPartyNumberDcd.

7. Core INAP Routines

The Core INAP Message Set initialization routine provides several functions. It (1) supports Configurable Numbering Plan table tags/values; (2) provides a function pointer to the Telecomponent manipulator function in the Core INAP message set initialization routine; and (3) provides an error message, logs an alarm and stops the initialization if MSAP is started and either the tables are not found or there is an inconsistency or incorrect entry in any of the configurable numbering plan tables.

A Core INAP Network Operator Specific configuration file contains the following information: (1) INAP_DIALING_PREFIX; (2) AREA_CODE_TBL; (3) OPSEL_TBL; (4) IOPSEL_TBL; and (5) SVC_CODE_TBL. The tag values may be different among the network operators. ISCP will contain the Configurable Numbering Plan tables with the proper country suffix as part of the table names. For example, AREA_CODE_FIN or AREA_CODE_TEL.SVC_CODE_FIN, or SVC_CODE_TEL, OPSEL_CODE_FIN or OP_SELECT_TEL.

In addition, an enhanced ServiceKey Analysis Routine will determine whether the Configurable Numbering Plan feature is turned on or off from the "CIN_CFN_EQUIPPED" flag in the configuration file "isms_cfg.dat." Currently, the ServiceKey Analysis routines perform a table look-up from the TCAP message parameters decoded by the TCAP parser to determine the type of ServiceKey criteria and determine the value of the service key value. Depending on the ServiceKey matching criteria, the "ServiceKey," "CallingPartyNumber," or "CalledPartyNumber" parameter becomes the ServiceKey value.

In the conventional ServiceKey Analysis, the ISCP receives the TN with the prefix in front of the CallingPartyNumber or CalledPartyNumber parameters. This analysis now strips the prefix prior to a database lookup for the CPR key match to find the CPR whose name matches the ServiceKey value, i.e., "CallingpartyNumber" or "CalledPartyNumber." For example, a long distance call made by dialing the operation selection code has the National Operator Selection code appended in front of the "CalledPartyNumber" parameter. When the "CalledPartyNumber" becomes the ServiceKey value, the "Operator Selection Code" prefix in front of the CalledPartyNumber parameter must be removed to produce the correct CPR name.

The new ServiceKey Analysis routine therefore adds a function call to the "SVK_Remove_Prefix" routine to remove the operator selection code prefix appended to the telephone number. It also populates the Core INAP Service Key call variable with the telephone number without any prefix (operator selection codes) when the CallingPartyNumber or CalledPartyNumber becomes the ServiceKey value. This routine is invoked only when the Configurable Number Plan feature is turned on.

8. Messages and Parameters

Predefined call variables can use data types that are not available to users. These additional data types include enumerated types, structures, and sequences. Sequences are similar to arrays, although they are not necessarily homogeneous because each element in the sequence does not have to be the same data type. Core INAP will not support user defined structs, enumerations or sequences.

The ISCP accepts and processes, and the MSAP extracts, the value of each of these incoming INAP message parameter and executes decisions based on service logic selected by Service Key Analysis. several incoming message parameters. These include: (1) Service Key; (2) Called Party Number; (3) Calling Party Number; (4) Calling Party Category; (5) CG Encountered; (6) Location Number; (7) Original Called Party ID; (8) High Layer Compatibility; (9) Service Interaction Indicators; (10) Additional Calling Party Number; (11) Forward Call Indicators; (12) Bearer Capability; (13) Event Type BCSM; (14) Redirecting Party ID; (15) Redirection Information; (16) Counters Value (e.g., Counter ID and Counter Value; (17) Filtering Criteria (Service Key or Called Address Value+Service Key+Calling Address Value+Location Number); and (18) Extensions.

SPACE provides the constructs to provide graphical user interface support for service logic used by MSAP to process these incoming INAP message parameters. The preferred constructs are pre-defined call variables populated by incoming message parameters and decision nodes based on them.

9. Transaction Injector

The Transaction Injector (TI) generates the following two messages based on the parameters listed above: (1) Initial DP Operation; (2) RequestReportBCSMEvent message.

The message operation of FIG. 2 can now be explained in greater detail. SSF entity 220 sends an Initial DP Operation message to SCF entity 230 when encountering an armed trigger detection point during AIN call processing. SSF entity 220 later sends information about the call to SCF entity 230 to establish a control relationship between SCF entity 230 and the call. SCF entity 230 can influence call processing via Core INAP messages it sends in response to the InitialDP message. The EventTypeBCSM parameter indicates the DP encountered.

SSF entity 220 typically sends an Initial DP Operation message only once per call for an IN-supported service. SSF entity 220 uses the RequestReportBCSMEvent message to request information regarding later events associated with an AIN call. In such a case, SCF 220 may maintain the control relationship with the call.

The InitialDP Operation message supports the following parameters: Service Key, Called Party Number, Calling Party Number, Calling Party Category, CG Encountered, Location Number, Original Called Party ID, High Layer Compatibility, Service Interaction Indicators, Additional Calling Party Number, Forward Call Indicators, Bearer Capability, Event Type BCSM, Redirecting Party ID, Redirection Information, sF Encountered, gap Interval (data type: Interval).

The Service Key parameter is the only mandatory parameter, and it may be the only input to the ISCP Service Key Analysis process invoked to select the CPR to control ISCP query processing. The Service Key parameter is an integer which seems intended to be strictly a unique table or database key. Other parameters that may be used in Service Key Analysis are the EventTypeBCSM parameter, the Called Party Number parameter, the Called Party Number parameter and the Calling Party Number parameter.

The EventTypeBCSM parameter identifies the TDP at which the incoming InitialDP message was launched. SSP query messages launched from different call model detection points could correspond to different services all or some of which may be subscribed to by a single customer. In this case, the customer could have several service logic programs SLPs associated with service record. The EventTypeBSCM parameter identifies the appropriate SLP to be executed in response to an SSP query message.

The Called Party Number parameter and the Calling Party Number parameter are self-explanatory. The CallingParty- Category parameter also indicates the type of terminal or customer originating the call. The CG Encountered parameter indicates whether call gapping is engaged at the SSF. The Location Number parameter conveys the geographical area address of the calling party. The Original Called Party ID parameter and the Redirecting Party ID parameter are sent to the SCF when the call being processed has been forwarded or redirected before it reached the initiating SSF. The Redirecting Information parameter conveys information related to call redirection, such as the number of times a call has been redirected.

The High Layer Compatibility parameter and the Bearer Capability relate to ISDN services. The Forward Call Indicators parameter conveys information about calls that span multiple provider networks. The Additional Calling Party Number parameter is used for conveying address information for calls spanning multiple networks.

The SSF uses the ServiceFilteringResponseOperation (SFRO) message to send to the SCF the value of call counters specified in a previously requested ActivateServiceFiltering (ASF) message. In doing so, the SFRO message reiterates the filtering criteria specified by the SCF in the ASF message.

The SFRO message also contains the following parameters: Counter ID, Counters Value, Service Key, Called Party Address, Calling Address Value, and Location Number. The Counters Value parameter contains an incremental count for each counter created as a result of the original ASF message. There will be a one-to-one mapping of counters to telephone numbers specified by the original ASF message. Each counter subparameter value will match the last two digits of the telephone number with which it is associated.

A Filtering Criteria parameter is a playback of the same parameter sent in the ASF request and may be used to correlate service filtering requests with service filtering responses.

The parameters on outgoing non-conversational messages include: (1) Destination Routing Address; (2) Alerting Pattern; (3) Cut and Paste; (4) Original Called Party ID; (5) Route List; (6) Service Interaction Indicators; (7) Calling Party Number; (8) Calling Party Category; (9) Redirecting Party ID; (10) Redirection Information; (11) Gap Criteria including (Called Address Value, Service Key, Location Number, and Gap On Service); (12) Gap Indicators (Duration and Gap Interval); (13) Control Type; (14) Gap Treatment (Information to Send and Release Cause); (15) SCI Billing Characteristics; (16) LegID; (17) Filtered Call Treatment (SCF Billing Characteristics, Information To Send, In-Band Info, Message ID, Number of Repetitions, Duration, Interval, Tone, Tone ID, Tone Duration, and maximum Number of Counters); (18) Filtering Characteristics (Interval and Number of Calls); (19) Filtering Time Out (Duration and Stop Time); (20) Filtering Criteria (Service Key, Address and Service Key, Called Address Value, Calling Address Value, and Location Number); (21) Start Time; (22) FCI Billing Charging Characteristics; (23) timer ID; (24) timer Value; (25) Cause; and (26) Extensions.

SPACE provides the constructs for graphical user interface support of service logic MSAP uses to set these outgoing TCAP message parameters. Those constructs include SPACE predefined call variables used to populate the outgoing message parameters and assignment nodes to assign values to them.

MSAP generates messages based on a service logic construct encountered during the processing of an incoming message. Each message is uniquely characterized by its TCAP Operation Code parameter.

SPACE also provides the constructs for graphical user interface support of service logic used by MSAP to generate other outgoing TCAP messages. The TI accepts certain messages sent by MSAP in response to ISCP inbound messages generated by the TI.

The SCF uses the Connect Operation message to provide the SSF entity with call routing information. This message contains the following parameters: Destination Routing Address (Sequence of Called Party Numbers), Alerting Pattern, Cut And Paste, Original Called Party ID, Route List, Service Interaction Indicators, Calling Party ID, Calling Party Category, Redirecting Party ID, Redirection Information.

The mandatory parameter, Destination Routing Address, contains the routing number. This parameter may also contain a list of numbers the SSP could use as the routing number. The Route List parameter can direct the SSF entity to use a switch-resident, predefined list of outgoing trunk groups for completing the call. The Cut And Paste parameter specifies the number of digits in the called party number to delete and replace with the contents of the Destination Routing Address parameter.

The Call Gap operation reduces the volume of initial query messages the SSF entity sends to the SCF during SCF entity overload situations. The SCF can qualify the Call Gap operation to restrict delivery of certain classes of messages such as messages related to a particular service. This operation contains the following parameters: Called Address Value, Called Address Value and Service, Gap On Service, Calling Address And Service, Duration, Gap Interval, Control Type, Information to Send, and Release Cause.

A Gap Criteria parameter qualifies the call gapping operation. Call gapping can be based on a specific service, on a called or calling number, or on a combination of service and called or calling number. The Gap Indicators parameter sets the duration of call gapping and the frequency at which the SSF entity may send initial queries to the SCF, i.e., the filtering frequency. The Control Type parameter indicates whether the call gapping is automatic or manual. The Gap Treatment parameter specifies how to terminate AIN calls that are filtered out.

The Called Address And Service parameter and the Calling Address And Service parameter allow the SCF to request call gapping based on both a service key and a called or calling number.

The Send Charging Information Operation message conveys call charging instructions from the SCF to the SSF entity. This message is used when the billing record for an AIN call is registered in a non-IN switch. The SSF entity uses information conveyed in this message to signal charging instructions to the exchange that will register the billing record.

The Send Charging Information Operation message contains two parameters: SCI Billing Charging Characteristics and LegID. The SCI Billing Charging Characteristics parameter conveys to the SSF entity information about signaling to control call charging. Because various exchanges and interexchange facilities use different techniques for signaling call charging information, this parameter is specific to the particular network operator. The LegID parameter indicates whether the charging signals are sent to the exchange at the calling or called party's side of the call.

The SCF uses the Continue Operation message to direct the SSF entity to continue basic call processing. No call-related data passes from the SCF to the SSF entity. The SSF entity simply continues call processing from the PIC where the last Detection Point triggered. The Continue operation has no parameters.

Using the InitiateCallAttempt operation, the SCF can initiate a call attempt to a single Called Party through the SSF entity. This operation appears in one TCAP message together with a RequestReportBCSMEvent operation and a Continue operation, in that order. On receiving the InitiateCallAttempt operation, the SSF entity begins processing the SCF-initiated call and suspends call processing at DPI. The SSF entity first processes the RequestReportBCSMEvent operation to enable subsequent event detection points for the call, and then processes the Continue operation to cause call processing to resume. This operation contains the following parameters: Destination Routing Address (Sequence of called Party Number), Alerting Pattern, Service Interaction Indicators, and Calling Party Number.

The Destination Routing Address parameter contains the number to be called. The Alerting Pattern parameter requests distinctive ringing. The Service Interaction Indicators parameter is network-operator specific. The Calling Party Number parameter designates a calling party number for the call and may be used in connection with other services applicable to the call.

The ASF (Activate Service Filtering) message allows the SCF to instruct the SSF entity to "filter" calls to a specific telephone number or set of telephone numbers. "Filtering" a call in this context terminates the call to a tone or announcement. At intervals specified in a message parameter (elapsed time or number of calls), the SSF entity will send the SCF the number of calls to and from each number that have been filtered.

One use of this message is televoting services. For example, dialing a number to televote generates a message acknowledging the vote, and the SSF entity bumps up a counter. The SSF entity then sends the value of counters associated with each of the telephone numbers in the ServiceFilteringResponse message. The SSF entity performs the call filtering without involving the SCF in every call.

The following parameters can be involved with the ASF message: filtered Call Treatment (sF Billing Charging Characteristics, Information to Send (in band Info (Message ID, Number of Repetitions, Duration, Interval), tone (tone ID and Duration)), Maximum Number Of Counters, Release Cause), Filtering Characteristics (Interval or Number of Calls), filtering Time Out (Duration, Stop Time (Date and Time)), filtering Criteria (Service Key, address and Service (Called Address Value, Service Key, Calling Address Value, Location Number)), Start Time (Date and Time).

The Filtered Call Treatment parameter specifies how filtered calls should be billed and terminated, for example by tone or announcement. This parameter also specifies how many counters and, therefore how many telephone numbers, should be covered by a particular service filtering request. The telephone numbers covered by a service filtering request is calculated as follows:

CalledAddressValue←CalledAddressValue+(MaximumNumberOfCounters−1).

This calculation has two constraints. First, the last two digits of the Called Address Value subparameter must be no greater than (100−MaximumNumberOfCounters). Second, no counter values will be returned to the SCF in the absence of the MaximumNumberOfCounters subparameters.

The Filtering Characteristics parameter specifies the frequency of responses from the SSF entity. Each response will contain an incremental call count for each of the counters created by the initial ASF message. The Filtering Time Out parameter indicates the requested duration of service filtering. The Filtering Criteria parameter specifies the telephone number, the called number and, optionally, the calling number to trigger service filtering on the SSF entity. The Start Time parameter specifies the date and time to begin service filtering at the SSF entity.

The Information To Send parameter includes the Inband Info subparameter, which conveys information about announcements to be played to the caller, and the tone subparameter, which conveys information about a tone to be played to the caller. The two parameters are mutually exclusive.

The Message ID parameter also conveys information about announcements to be played to the caller. This parameter can specify a single message (announcement) identifier or multiple identifiers. Additionally, the parameter can specify a message identifier that supports a "fill in the blank" option.

Core INAP defines a RESULT for this operation. The RESULT has no parameters. It is simply an acknowledgment from the SSF entity that the ASF message has been accepted and will be performed.

The SCF uses the FurnishChargingInformation message to provide the SSF entity with information related to charging for an AIN call. This operation is used when the billing information sent by the SCF to the SSF entity within the FurnishChargingInformation message component is network-operator specific.

The FCI Billing Charging Characteristics parameter, the only parameter involved in the FurnishChargingInformation message, conveys call charging information. The network operator can define this parameter to contain subparameters that represent those aspects of call charging the operator wishes the ISCP to control.

The SCF uses the ReleaseCallOperation message to request the release of a call at the SSP. To identify the call to be released, the SSP will use the transaction ID in the transaction portion of the TCAP message containing the ReleaseCallOperation. The SSP may use the Cause parameter to generate specific tones to the parties on the call.

The DisconnectForwardConnection operation directs the SSF entity to disconnect a call from an assisting SSF entity or an SRF. The SCF sends a DisconnectForward Connection operation request to the initiating SSF entity at the completion of caller interaction at the assisting SSF entity or SRF. The SCF can continue with service logic execution after this operation request is sent.

The SCF uses the ResetTimer operation to reset the value of a specific timer, for example the timer used to detect an SCF response time-out condition, within the SSF entity. The new timer value can be specified within the ResetTimer message by the Timer Value parameter. The Timer ID and the Timer Value parameters are the only parameters involved in this message. The Timer ID parameter identifies the SSF entity timer to be reset. The default Timer ID, $T_{SSF}$, the timer used for responses from the SCF and completion of caller interaction.

A conversational interaction between an ISCP and an SSP begins with a message sent from the ISCP to the SSP in response to a message received after the ISCP receives a message from the SSP and determines, through service logic, that the ISCP and SSP should enter into a conversation interaction. The interaction involves the ISCP sending a message to the SSP requesting it to perform some particular action and then report back the results. The conversation continues as the SSP sends a message containing the reported information back to the ISCP.

The parameters on outgoing conversational messages include : (1) Resources Address (IP Routing Address (Called Party Number)); (2) Information To Send (In-Band information, Message ID, Number of Repetitions, Duration, Interval, Tone, Tone ID, and Tone Duration); (3) Disconnect From IP Forbidden; (4) Request Announcement Complete; (5) Collected Information (Minimum Nbr of Digits, Maximum Number of Digits, End of Reply Digit, Cancel Digit, Start Digit, First Digit Time Out, Inter Digit Time Out, Error Treatment, Interruptible Announcement Indicator, Voice Information, and Voice Back); (6) BCSM Events (Event Type BCSM, Monitor Mode, LegID, Dp Specification Criteria, Number of Digits, and Application Timer); (7) Requested Information Type List; (8) aCh Billing Charging Characteristics; (9) Send Calculation To SC Indicator; (10) Party to Charge (LegID); (11) Assisting SSP IP Routing Address; (12) Charging Event; and (13) Extensions.

The MSAP sets the value of each outgoing TCAP message parameter listed above based on service logic. SPACE provides the constructs for graphical user interface support for service logic. The SPACE constructs consist of pre-defined call variables to populate the outgoing message parameters and assignment nodes to assign values to them.

MSAP generates each of the following outgoing TCAP messages based on a service logic construct encountered during the processing of an incoming message. These messages are uniquely characterized by its TCAP Operation Code parameter. The TI accepts the messages sent by MSAP in response to ISCP inbound messages generated by the TI. SPACE provides the constructs, preferably network action nodes, for graphical user interface support of MSAP service logic to generate the messages.

The ConnectToResource operation directs either an initiating SSF entity or an assisting SSF entity to connect a call to an SRF for caller interaction. This operation can be used where the SRF is either integrated within the SSP or where the SCF communicates with the SRF via the SSF entity. This operation may not be required where the SCF communicates directly with the SRF, i.e. direct communications between an ISCP and an IP. This message uses the Resources Address parameter.

The Resource Address parameter can be two selectable data types. When the SRF is integrated within the SSP, the parameter should contain the NULL value. When the SRF is implemented in an IP and the SCF communicates with the SRF via an SSF entity, the Resource Address parameter should contain a network address assigned to the IP.

The SCF can use the PlayAnnouncement Operation to request the SRF, which may be integrated within the SSF entity or a stand-alone network addressable element, to play an announcement. The operation contains the following parameters: Information to Send, Disconnect From IP Forbidden, and Request Announcement Complete.

The Information To Send parameter conveys information regarding the announcements or tone to be played to the caller. The Disconnect From IP Forbidden parameter tells the SRF whether to disconnect itself from the call after completing the caller interaction. The Request Announcement Complete parameter requests a notification from the SRF when the caller interaction completes. The notification is sent in the form of a SpecializedResourceReport message.

The PromptAndCollectUserInformation operation includes both an argument and a result. The SCF entity conveys the operation argument to the SRF in a invoke type message component, and the SRF sends the operation result to the SCF from in a result type message component.

The invoke type messages contains the following parameters: Collected Digits (Minimum Nbr of Digits, Maximum Nbr of Digits, End Of Reply Digit, Cancel Digit, Start Digit, First Digit Time Out, Inter Digit Time Out, Error Treatment, Interruptible Ann Ind, Voice Information, Voice Back), Disconnect From IP Forbidden, Information To Send. The SCF can use this operation to request caller interaction for the collection of additional information. The format of the caller-prompting information contained in this operation is the same as the format of the announcement information in the Play Announcement operation, i.e. the Information To Send parameter. This operation also contains information about the number of digits to collect, and it identifies digits that control the process of digit entry. This information is conveyed in the Collected Info parameter.

The SCF can use the Cancel operation to cancel a previously issued caller interaction request. The SCF uses the invoke ID of the targeted operation request to identify the operation to be canceled. This operation can also be used to cancel all outstanding operation requests sent by the SCF in the context of a single transaction. For example, the SCF can cancel outstanding event notification requests for a specific AIN call in progress. The SCF uses the invoke ID parameter in this latter case.

The Collect Information operation collects additional address digits from the calling party. The SSF entity receives this operation in a single message with a RequestReportBCSMEvent operation. The RequestReportBCSMEvent operation precedes the CollectInformation operation in the composite message. When the SSF entity receives this message, it enables the Collect Information Detection Point and moves call processing to the Collect Information Point in Call. The switch then collects digits from the calling party and sends them to the ISCP in an EventReportBCSM Event message. The message will contain the collected digits in the EventSpecificInformationBCSM parameter. The Collect Information operation has no parameters.

The SCF uses the RequestReportBCSMEvent operation to request and define an ongoing relationship with a call in progress. The ongoing relationship is defined by listing call processing events of interest to the SCF. Subsequent event reporting messages will be either EDP-Request or EDP-Notify type messages depending on whether a control or monitor relationship is requested, respectively. The following parameters are associated with this operation: Event Type BCSM, Monitor Mode, LegID, dPSpecific Criteria (Number of Digits, Application Timer).

The mandatory BCSM Events parameter can be a sequence of BCSMEvent parameters. As a result, the SCF can use a single RequestReportBCSMEvent message component to direct the SSF entity to send event reports associated with several types of call processing event. The Event Type BCSM subparameter specifies one of a list of pre-defined call processing events of which a report is requested.

The Monitor Mode parameter requests either active (control) or passive (monitor) involvement in ongoing call processing. The LegID parameter specifies the call leg for which events are reported. The dPSpecificCriteria parameter contains NumberOfDigits and ApplicationTimer information associated with specific detection points. The NumberOfDigits parameter is associated with the Collect_Information DP, and instructs the SSF entity how many digits to collect from the calling party. The ApplicationTimer information is associated with the No_Answer DPs, and controls length of the no-answer time out on the called party call leg.

The SCF sends the CallInformationRequest Operation message to the SSF entity requesting that it save and return call information related to an AIN call being processed at the SSF entity the value of one or more predefined call information variables including the duration of the call. The parametric content of this message is a list of Requested Information Type parameters.

The Requested Information Type List parameter specifies the call-related data requested from the SSF entity. The SSF entity provides five types of information in the preferred embodiment.

The SCF uses the ApplyCharging operation to control AIN call charging. For example, the SCF can use this operation to instruct the SSF entity how to charge the call, to whom to charge the call, and whether the SSF entity should send the final call charging information to the SCF. The parameters associated with the Apply Charging Operation are: aCh Billing Charging Characteristics, Send Calculation To SC Indicator, and the Party To Charge (Leg Id).

The aCh Billing Charging Characteristics parameter conveys information about the method of call charging and charging thresholds for the call. The thresholds could be expressed in terms of time duration or charging units accumulated during the call. If the threshold is reached or the call is cleared, the SSF entity will send the accumulated charging information to the SCF if the SCF is to receive charging information.

The Send Calculation To ISCP Indicator indicates whether the SCF wishes to receive call charging information. The Party To Charge Parameter tells the SSF entity whether to charge the calling or called party for the call.

The SCF uses the EstablishTemporayConnection operation to direct the initiating SSF entity to connect an AIN call to an assisting SSF entity or to a SRF where some caller interaction will take place. The EstablishTemporaryConnection operation would be used to route an AIN call to an SRF in a stand-alone physical element, i.e., an IP.

The Assisting SSP IP Routing Address parameter contains the address of the assisting SSP or the IP. This parameter also contains the correlationID to be used in the later AssistRequestInstructions operation since the correlationID parameter is not required as a discrete parameter.

The ActivityTest message, which contains no parameters, verifies the existence of an SSF-SCF relationship at the TCAP dialogue level. The SCF uses this operation when a time-out associated with an expected SSF entity response occurs. At that point, the SCF would send the ActivityTest operation to the SSF entity requesting information about the status of the transaction associated with the time-out. If the SSF entity indicates that the transaction is still active, the SCF can reset the appropriate timer and continue to wait for the expected response. If the SSF entity does not reply to the ActivityTest operation or sends a TC-Abort message, the SCF knows that either the SSF entity is not available or the transaction failed, respectively.

The ISCP sends the RequestNotificationChargingEvent Operation message to the SSF entity when it wishes to control the generation of call charging information at a local exchange switch for an AIN call. The SSF entity notifies the SCF using an EventNotificationCharging message when it detects a later call charging event. The ISCP can follow the notification message with a SendChargingInformation message to instruct the SSF entity to send call charging instructions to the PSTN switch that registers the billing record for the call. The RequestNotificationChargingEvent operation contains the ChargingEvent parameter.

The parameters on incoming conversational messages are (1) Digits Response; (2) Event Type BCSM; (3) Event Specific Information BCSM (Route Select, Called Party Busy Specific information, Disconnected Specific Information; t Called Party Busy Specific Information, t Disconnect Specific Information); (4) LegID; (5) Misc Call Information; (6) Request Information Type List (Request Information Value, Call Attempt Elapsed Time Value, Call Stop Time Value (Date and Time), Call Connected Elapsed Time Value, and Called Address Value; (7) Call Result; (8) correlation ID; (9) Event Type Charging; (10) Event Specific Information Charging; and (11) Extensions.

MSAP extracts the value of each of these incoming TCAP message parameters, and SPACE provides graphical user interface support constructs for service logic used by MSAP to process these incoming TCAP message parameters. The preferred SPACE construct to support this requirement are CVs populated by incoming message parameters and decision nodes based on them.

MSAP processes the following messages, each uniquely characterized by its TCAP Operation Code parameter, which the SSP sends only in response to a message sent from the ISCP. The ISCP will correlate these messages with the context of the call that resulted in the ISCP-SSP message that caused the message to be returned. MSAP will return processing control to service logic that makes decisions based on the parameters supplied in the incoming messages. The TI generates the following messages based on user input of data solicited by the outgoing (from the ISCP) conversational transaction.

The PromptAndCollectUserInformation Return Result message returns the results from the SSP to the ISCP that the Prompt and Collect User Information Operation requested. The only parameter, the Digits Response parameter, repeats the same parametric structure as the Prompt and Collect User Information Operation.

The SRF sends the SpecializedResourceReport Operation message to the SCF when the SCF has requested notification of the completion of a PlayAnnouncement operation. There are no parameters associated with this message.

The SSF entity sends the EventReportBCSM Operation message is sent to the SCF to report on the occurrence of a call processing event. The set of reported call processing events is the same as the set of Detection Points defined within the AIN CS-1 call model. The EventReportBCSM message responds to a previous request from the SCF requesting ongoing call processing information and contains the following parameters: Event Type BCSM, Event Specific Information BCSM (route Select Failure specific Info, Called Party Busy Specific Info, Disconnect Specific Info, Called Party Busy Specific Info, Disconnect Specific Info), LegID, and Misc Call Info.

The only mandatory parameter for this operation, Event Type BCSM, identifies the Call Model Detection Point associated with the call processing event being reported. The Event Specific Information BCSM parameter contains call-related information specific to the type of event being reported. The LegId parameter identifies the call leg, i.e., the calling or called party call leg, associated with the event being reported. The Misc Call Info parameter indicates the type of event report message, request (SCF controls subsequent call processing) or notify (SCF monitors only). The value of this parameter depends on the value of the Monitor Mode parameter in the Request Report BCSM Event operation.

The SSF entity sends the CallInformationReport Operation message containing call-related information to the SCF in response to a previous request by the SCF during AIN call processing, made by the CallInformationRequest message. The CallInformationReport Operation message contains the following parameters: Requested Information List (Request Information Type, Request Information Value), Request Information Value (Call Attempt Elapsed Time Value, Call Stop Time Value, Called Address Value, and Release Cause Value).

The Requested Information List parameter contains the result of the Call Information Request operation, which could contain more than one value. The Called Address Value subparameter is the value of the original address digits received by the SSF entity before any number translation.

The SSF entity sends the ApplyChargingReport operation request to the SCF when a call charging threshold has been reached or a call is cleared if the SCF previously requested this information via a ApplyCharging operation request. The only parameter for this request is Call Result which contains the request call charging information.

An assisting SSF entity or an SRF sends an AssistRequestInstructions operation request to the SCF that has riouted a call to perform caller interaction. The sending SSF entity or SRF uses this operation to get further instructions on processing the call. The SCF will typically send a ConnectToResource operation request in response to the AssistRequestInstructions operation to indicate that some caller interaction request is forthcoming. The only required parameter for this operation is the correlationID parameter which the SCF uses to match this operation request to an active call (transaction) context.

When the SSF entity receives an Activity Test Operation and wishes to acknowledge that the transaction is still active, it sends a Return Result to the Activity Test. This message has no parameters.

The SSF entity sends the EventNotificationCharging Operation message to the SCF to notify the SCF of a charging event and send to the SCF call charging information previously requested by the SCF in the Request NotificationChargingEvent message. The information requested and subsequently sent to the SCF is defined by the network operator. The following parameters are supported as arguments of the EventNotificationCharging operation: EventTypeCharging, EventSpecificInformationCharging, and LegID.

7. CONCLUSION

This invention achieves its goals by ensuring that telephone switching networks can recognize and respond to telephone numbers with a variety of formats and from several different countries. The processing proceeds according to the nature of the address of the number and sometimes according to the format of the number.

Persons skilled in the art will recognize that they can make various modifications and variations in the implementation and structure of the present invention without departing from its scope or spirit. The specification and practice of the invention will also suggest modifications. The specification should therefore be considered only as exemplary. The following claims define the true scope and spirit of the invention.

What is claimed is:

1. A method for parsing a telephone number in an intelligent switch of a telephone network comprising the steps of
   determining the nature of address (NOA) of the telephone number as national, international, or other, and
   appending a dialing prefix to the telephone number and processing the telephone number further if the nature of address is national,
   said processing including executing error handling procedures if the telephone number has no international prefix, said error handling procedures determining the format of the telephone number, parsing the telephone number if the telephone number has a long distance format and a recognizable area code, and ceasing any further error handling if the telephone number has a long distance format but no recognizable area code.

2. A method for parsing a telephone number in an intelligent switch of a telephone network comprising the steps of
   determining the nature of address (NOA) of the telephone number as national, international, or other, and
   appending a dialing prefix to the telephone number and processing the telephone number further if the nature of address is national,
   said processing including executing error handling procedures if the telephone number has no international prefix, said error handling procedures determining the format of the telephone number, parsing the telephone number into a prefix and digits if the telephone number has a special number format and a recognizable special number, and ceasing further error handling if the telephone number has a special number format but no recognizable special number.

3. A method for parsing a telephone number in an intelligent switch of a telephone network comprising the steps of
   determining the nature of address (NOA) of the telephone number as national, international, or other, and
   processing the telephone number further if the nature of address is other than national or international,
   said processing including
     parsing an international prefix of the telephone number and saving the international prefix and the remainder of the telephone number if the international prefix is recognizable,
     continuing parsing if the international prefix is not recognizable but the telephone number contains a national operator selection code, and
     executing error handling procedures if the international prefix is not recognizable but the telephone number contains no recognizable national operator selection code.

4. The method of claim 3 wherein the substep of continuing parsing further includes the substeps of
   parsing the national operator selection code and the remainder of the telephone number including an area code and a local subscriber number;
   saving the parsed national operator selection code;
   saving the parsed remainder of the telephone number if the area code is recognizable; and
   executing error handling routines if the area code is not recognizable.

5. The method of claim 4 wherein the substep of executing error handling routines further includes the substeps of
   discontinuing further parsing if the telephone number format is long distance and the area code is not recognizable; and
   continuing to parse the telephone number if the telephone number format is long distance and the area code is recognizable.

6. The method of claim 4 wherein the substep of executing error handling routines further includes the substeps of
   discontinuing further parsing if the telephone number format is special number and the special number is not recognizable; and
   parsing the telephone number into its prefix and other digits if the telephone number format is special number and the special number is recognizable.

7. The method of claim 6 wherein the substep of parsing the telephone number further includes the substep of saving the prefix and other digits.

8. A method for processing telephone numbers having possibly conflicting numbering plans in an intelligent switch of a telephone network and comprising the steps of determining the nature of address (NOA) of a telephone number as national, international, or other, extracting the fields of the telephone number according to the nature of address, processing the telephone number further if the nature of address is other than national or international, parsing an international prefix of the telephone number and saving an international prefix, an area code, and a local subscriber number of the telephone number if the international prefix is recognizable, continuing parsing if the international prefix is not recognizable but the telephone number contains a national operator selection code, and executing error handling procedures if the international prefix is not recognizable but the telephone number contains no recognizable national operator selection code.

9. A telephone communications system for establishing connections for international calls between networks having conflicting numbering plans, said system comprising a plurality of switches to route telephone calls, a plurality of databases having processing records for routing telephone calls, said processing records including multiservice application platform and service creation environment based call processing records, and a plurality of intelligent service control points, coupled to said plurality of switches and databases, to control the routing of telephone calls by said switches in accordance with the telephone numbers for those calls, each of said service control points including means for determining the nature of address of a telephone number as national, intentional, or other, means for storing the telephone number and separating the telephone number into numbering plan and address digit fields, means for extracting said fields from the telephone number and for parsing the telephone number based on the nature of address of the telephone number, and means for saving the parsed components of the telephone number.

10. A method for establishing connections between telephone subscribers in networks in different locations having possible conflicting numbering plans comprising performing, in an intelligent switch in one of the networks, the steps of determining the nature of address of a telephone number from one of the telephone subscribers as national, international, or other, and processing the remainder of the telephone number other than the nature of address according to the determination of the nature of address for the telephone number to enable the establishment of the connection desired by the one telephone subscriber, said processing step including storing the remainder of the telephone number if the nature of address is international and appending a dialing prefix if the nature of address is national.

* * * * *